United States Patent [19]

Coombs

[11] 3,723,483
[45] Mar. 27, 1973

[54] 11β-METHYL-17α-PROPADIENYL STEROIDS

[75] Inventor: Robert V. Coombs, Summit, N.J. Ave., Summit, N.J.

[73] Assignee: Sandoz-Wander, Inc., Hanover, N.J.

[22] Filed: July 27, 1970

[21] Appl. No.: 58,682

[52] U.S. Cl. ...........260/397.45, 260/397.5, 424/243
[51] Int. Cl.............................................C07c 169/22
[58] Field of Search .......Machine Searched Steroids

[56] References Cited

UNITED STATES PATENTS

| | | | |
|---|---|---|---|
| 3,392,166 | 7/1968 | Edwards et al. | 260/239.55 |
| 3,325,520 | 6/1967 | Baran | 260/397.45 |
| 3,377,366 | 4/1968 | Baran | 260/397.45 |
| 3,465,010 | 9/1969 | Baran | 260/397.5 |

*Primary Examiner*—Henry A. French
*Attorney*—Gerald D. Sharkin, Frederick H. Weinfeldt, Robert S. Honor, Walter F. Jewell and Richard E. Vila

[57] ABSTRACT

11β-methyl-17α-propadienyl substituted steroids, e.g., 17β-hydroxy-11β-methyl-17α-propadienylestra-4-en-3-one, are prepared by reducing the corresponding 11β-methyl-17α-quaternary amino-propynyl steroid salt and are useful as progestationals in fertility control.

7 Claims, No Drawings

11β-METHYL-17α-PROPADIENYL STEROIDS

This invention relates to 11β-methyl-17α-propadienyl-4 or 5(10)-en-steroid, intermediates for their preparation and their use in fertility control.

The compound of this invention may be represented by the formula

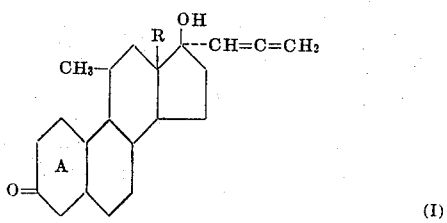

where
R is unbranched lower alkyl, i.e., unbranched lower alkyl having one to three carbon atoms; namely, methyl, ethyl or propyl; and

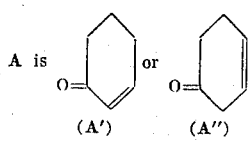

The compounds of formula I are prepared in accordance with the following reaction scheme:

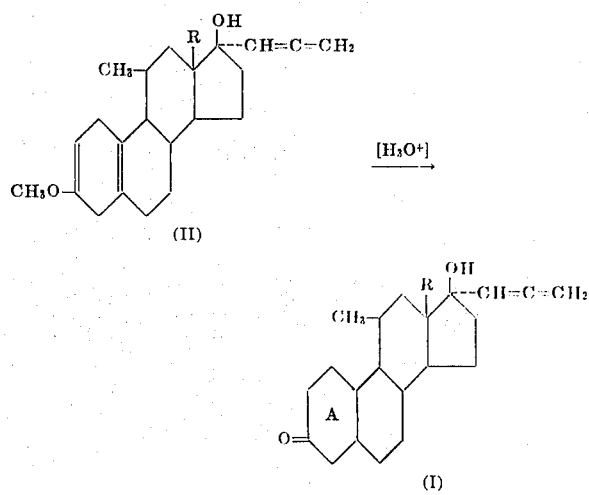

where R and A are as defined above.

The compound of formula I in which ring A is of the A' type are prepared by the acid cleavage-rearrangement of compounds of formula II, under vigorous acidic conditions. The vigorous acidic conditions may consist of carrying out the reaction either in a strongly acidic aqueous medium, i.e., at a pH value of less than 3 and preferably from 1 to 2 or alternatively, under milder acidic conditions, for example, at a pH value of from 3 to 4, over a relatively prolonged period, for example, in excess of 3 hours. Conventional water soluble inorganic or organic acids, e.g., sulphuric acid, p-toluene sulfonic acid, hydrochloric acid or oxalic acid may be used to provide the strongly acidic conditions; and water soluble organic acid, e.g., oxalic acid or acetic acid, may be used to provide the milder acidic conditions. The particular acid used in the reaction is not critical.

The process may be carried out at temperatures of from, for example, 0° to 100° C. preferably from 20° to 70° C. An inert water-miscible organic co-solvent, preferably a lower alcohol such as methanol may be used where desired and where a water-soluble organic acid, suitable as a solvent under the reaction conditions, is employed, the reaction may be carried out in an excess thereof. Neither the temperature nor the particular co-solvent used is critical.

A compound having an A'' type A-ring is obtained by carrying out the acid cleavage-rearrangement of the compound of formula II under the milder acidic conditions, described above. The remaining process details, that is, the particular acid used, the reaction temperature and the use of co-solvent are the same as above; and again, none of these conditions is critical to the process.

A compound having a A'' type A-ring may be converted to its analog having an A' type A-ring by vigorous acidic-rearrangement, that is, by employing the "vigorous" conditions described above, except that aqueous conditions are not essential, nor need the solvent be water-miscible. The vigorous conditions may involve either the treatment of the compound with the A'' type A-ring with acid at a pH of less than 3 or treatment of the compound with acid at a pH between 3 and 4 over a period in excess of 3 hours.

Alternatively, the rearrangement from the A'' to the A' type A-ring may be carried out in a basic medium, for example, employing aqueous sodium or potassium hydroxide, preferably at a concentration of from about 0.01N to about 2N. The basic rearrangement may be affected in an inert organic solvent such as dioxane, methanol or ethanol. It is preferred that the solvent of the rearrangement process be water-miscible. The reaction may be performed at a temperature of, for example, 20° to 120° C., preferably at the reflux temperature of the reaction medium. Suitable reaction times vary, for example, from about one-fourth hour to about 6 hours.

In the above processes, the product is recovered by conventional techniques, e.g., extraction and evaporation.

The compounds of formula II are novel and represent an additional aspect of this invention and are prepared in accordance with the following reaction scheme:

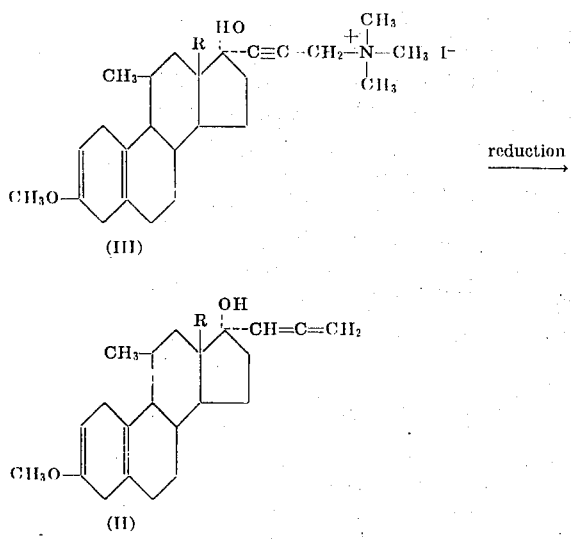

where R is as defined above.

The compounds of formula II are prepared by reducing a compound of formula III with a complex metal hydride in an inert solvent. The complex metal hydride can be any of the conventional complex metal hydrides, preferably lithium aluminum hydride or sodium dimethoxyethoxy aluminum hydride. The inert solvent may be any of the inert aliphatic or aromatic solvents or ethers, preferably benzene, diethyl ether or tetrahydrofuran. Although the temperature is not critical, the reaction is generally carried out at temperatures between −80° C. to +80° C., preferably between −10° C. to +10° C. Neither the particular complex metal hydride used not the solvent employed is critical. The product is recovered by conventional techniques, e.g., extraction and evaporation.

The compounds of formula III are novel and represent an additional aspect of this invention and are prepared in accordance with the following reaction scheme:

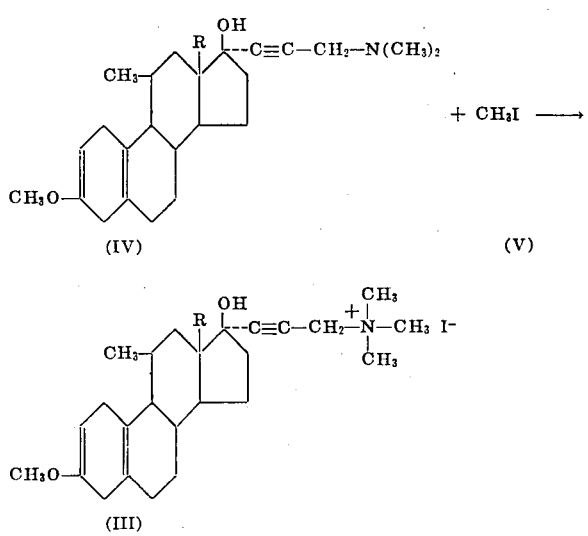

where R is as defined above.

The compound of formula III is prepared by treating a compound of formula IV with methyl iodide V. Although a solvent is not necessary, it is preferred that the reaction be carried out in an inert solvent, preferably acetone. The temperature of the reaction is not critical, although it is preferred that the reaction be carried out at a temperature of from about −20° C. to +30° C., especially between about −5° C. to about +10° C. The product is obtained by conventional methods, e.g., crystallization and filtration.

The compounds of formula IV are novel and represent an additional aspect of this invention and are prepared in accordance with the following reaction scheme:

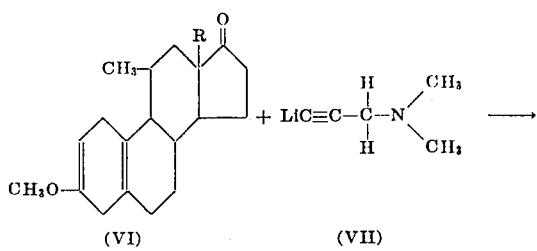

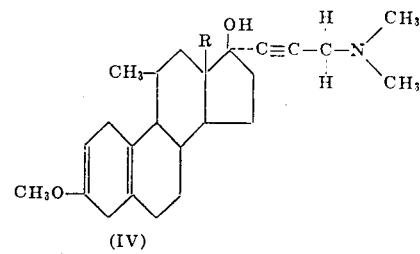

where R is as defined above.

The compounds of formula IV are prepared by treating a compound of formula VI with N,N-dimethylamino-2-propynyllithium in an inert solvent. The preferred inert solvents are diethyl ether or tetrahydrofuran. Where the N,N-dimethylamino-2-propynyllithium is prepared in situ in ethylenediamine, the ethylenediamine can be used as a co-solvent in the reaction. Although the temperature of the reaction is not critical, it is preferred that the process be carried out at temperatures between about −30° C. to +50° C. especially between about −20° C. to about +30° C. The product is obtained by conventional methods, e.g., by the addition of water or brine followed by extraction with ether and recrystallization.

The compounds V and VII and many of the compounds of formula VI are known and can be prepared by methods disclosed in the literature. The compounds of formula VI not specifically disclosed in the prior art can be prepared by analogous methods from known materials.

Compounds I are useful because they possess pharmacological properties in animals. In particular, such compounds are useful as fertility control agents in animals as they exhibit progestational activity. The progestational activity is indicated by the well known Clauberg test; the method basically described in Endocrinology 63 (1958) 464 wherein a rabbit is given 0.01 to 1.0 milligrams of active agent.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained in large animals, e.g., primates when the compounds are administered at a daily dosage of from about 0.01 milligram to 30 milligrams. This daily dosage is preferably given in equally divided doses, e.g., 1 to 2 times a day, or in sustained release form. It will be appreciated by those skilled in the art, that the daily dosage level is independent of body weight. Dosage forms suitable for internal administration comprise from about 0.005 mg. to about 30 mg. of the compound in admixture with a solid or liquid pharmaceutical carrier or diluent.

A representative formulation suitable for oral administration is a capsule (250 mg.) prepared by standard techniques which contains the following:

| Ingredient | Weight (mg.) |
| --- | --- |
| 17β-hydorxy-11β-methyl-17α-propadienylestra-4-en-3-one | 0.5 |
| Inert solid diluent (starch, lactose, kaoline) | 249.5 |

The following examples are provided as illustrative of the invention; all temperatures are Centigrade and room temperature is 20° to 30° C., unless indicated otherwise.

EXAMPLE 1

17β-hydroxy-11β-methyl-17α-propadienylestra-4-en-3-one

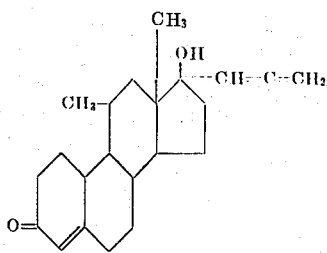

Step A — 3-methoxy-11β-methyl-17α-N,N-dimethylaminopropynylestra-2,5(10)-dien-17β-ol A total of 1.8 g of lithium is added in small portions to 120 ml of ethylene diamine with stirring at a temperature of 50° – 60° under nitrogen. After addition is complete, the blue solution is heated at 75° – 85° for 1 ½ hours whereat a pale yellow reaction mixture is obtained. This mixture is then cooled to 10°, and 20 g of N,N-dimethylamino-2-propyne is added dropwise over 5 minutes. Stirring is continued at room temperature for 1 hour, at which point a solution of 2.6 g of 3-methoxy-11β-methylestra-2,5(10)-dien-17-one in 40 ml of tetrahydrofuran is added. The mixture is now stirred at room temperature for 4 hours; and after cooling in an ice-water mixture, 100 ml of brine are added under nitrogen followed by 250 ml of ether. The two layers are separated, and the aqueous layer is extracted 3 times with benzene. The combined organic phases are washed with brine and dried over sodium sulfate. After removal of the solvents, the residue is crystallized from ether to yield 3-methoxy-11β-methyl-17α-N,N-dimethylaminopropynylestra-2,5(10)-dien-17β-ol (m.p. 170°–175°).

Step B — 3-methoxy-11β-methyl-17α-N,N-dimethylaminopropynylestra-2,5(10)-dien-17β-ol methiodide To a solution of 2.5 g of 3-methoxy-11β-methyl-17α-N,N-dimethylaminopropynylestra-2,5(10)-dien-17β-ol in 60 ml of acetone is added 15 ml of methyl iodide. The solution is kept at a temperature of 5° for 18 hours during which time a crystalline precipitate forms. This is filtered off and recrystallized from acetone to yield 3-methoxy-11β-methyl-17α-N,N-dimethylaminopropynylestra-2,5(10)-dien-17β-ol methiodide, m.p. 255°–260° (decomposition).

Step C — 3-methoxy-11β-methyl-17α-propadienylestra-2,5(10)-dien-17β-ol

To a suspension of 3.1 g of the iodide salt from Step B in 100 ml of anhydrous tetrahydrofuran, under ice cooling, is added 3 ml of a 70 percent solution of sodium di(methoxyethoxy)aluminum hydride [NaAlH₂(OCH₂.CH₂.OCH₃)₂] in benzene, diluted with 10 ml of tetrahydrofuran. The reaction mixture is allowed to warm to room temperature and stirred for a total of 2 hours at which time solution is complete. Water is then added to decompose the excess hydride and the tetrahydrofuran is removed under reduced pressure. The aqueous residue is extracted with methylene chloride and the organic phase is dried over sodium sulfate. After removal of the solvent, the residue is crystallized from ether/hexane (1:2) to yield 3-methoxy-11β-methyl-17α-propadienylestra-2,5(10)-dien-17β-ol, m.p. 135°.

Step D — 17β-hydroxy-11β-methyl-17α-propadeinylestra-5(10)-en-3-one

A suspension of 1 g of 3-methoxy-11β-methyl-17α-propadienylestra-2,5(10)-dien-17β-diol in a mixture of 20 ml of glacial acetic acid and 2.5 ml of water is stirred at room temperature for 1 ½ hours at which time solution is complete. The solution is diluted with ice/water and saturated aqueous sodium bicarbonate is cautiously added until the mixture is no longer acidic. The mixture is then extracted with ether and the organic solution is dried over sodium sulfate. Evaporation of the ether yields a residue which is crystallized from ether/hexane (1:2) to give 17β-hydroxy-11β-methyl-17α-propadienylestra-5(10)-en-3-one, m.p. 104° – 105°.

When the procedure of Step D is repeated and the reaction is run for 6 hours instead of 1 ½ hours, the product obtained is 17β-hydroxy-11β-methyl-17α-propadienylestra-4-en-3-one.

Step E — 17β-hydroxy-11β-methyl-17α-propadienylestra-4-en-3-one

To a solution of 800 mg of 3-methoxy-11β-methyl-17α-propadienylestra-2,5(10)-dien-17β-ol in 10 ml of methanol is added 5 drops of concentrated hydrochloric acid and the mixture is left at room temperature for 1 ½ hours. The mixture is then diluted with ice/water and a saturated aqueous solution of sodium bicarbonate is cautiously added until the mixture is no longer acidic. The solution is then extracted with ether, and the organic phase after separation is dried over sodium sulfate. Evaporation of the solvent yields a residue which is crystallized from ether/hexane, (1:2) to give 17 β-hydroxy-11β-methyl-17α-propadienylestra-4-en-3-one, m.p. 137° – 139°.

Step F — 17β-hydroxy-11β-methyl-17α-propadienylestra-4-en-3-one (alternate method A)

Replacing the 3-methoxy-11β-methyl-17α-propadienylestra-2,5(10)-dien-17β-ol in Step E by 17β-hydroxy-11β-methyl-17α-propadienyl-5(10)-en-3-one prepared by the procedure of Step D and following the procedure of Step E, there is obtained 17β-hydroxy-11β-methyl-17α-propadienylestra-4-en-3-one, m.p. 137° – 139°.

Step G — 17β-hydroxy-11β-methyl-17α-propadienylestra-4-en-3-one (alternate method B)

To a solution of 1.0 g of 17 β-hydroxy-11β-methyl-17α-propadienylestra-5(10)-en-3-one prepared as described in Step D of this example in 10 ml of methanol is added 10 ml of aqueous 0.1N potassium hydroxide and the resulting mixture is refluxed for 1 hour. Following this, the mixture is poured on water and the resulting precipitate is filtered, washed with water until neutral and then dried. Recrystallization from methylene dichloride-diethyl ether yields 17β-hydroxy-11β-methyl-17α-propadienylestra-4-en-3-one, m.p. 137° – 139°.

Following the procedures of Steps A through D, but substituting 3-methoxy-13β-ethyl-11β-methylgono-2,5(10)-dien-17-one for the 3-methoxy-11β-methylestra-2,5(10)-dien-17-one used in Step A, there is obtained 17β-hydroxy-13β-ethyl-11β-methyl-17α-propadienylgona-5(10)-en-3-one.

When 17β-hydroxy-13β-ethyl-11β-methyl-17α-propadineylgona-5(10)-en-3-one is used in place of 3- methoxy-11β-methyl-17α-propadienylestra-2,5(10)-dien-17β-ol in the process of Step E, there is obtained 17β-hydroxy-13β-ethyl-11β-methyl-17α-propadienyl-gona-4-en-3-one.

What is claimed is:

1. A compound of the formula

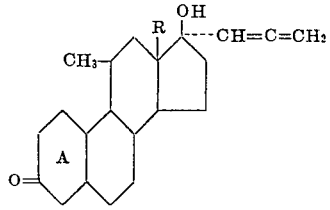

where

A is

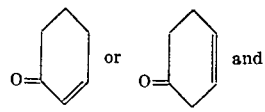

R is unbranched lower alkyl.

2. The compound of claim 1 which is 17β-hydroxy-11β-methyl-17α-propadienylestra-4-en-3-one.

3. The compound of claim 1 which is 17β-hydroxy-11β-methyl-17α-propadienylestra-5(10)-en-3-one.

4. A compound of the formula

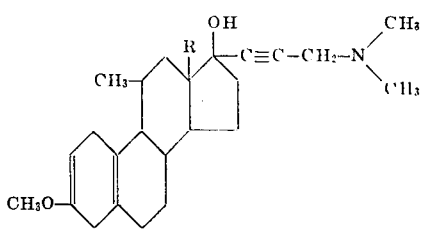

where

R is as defined in claim 1.

5. The compound of claim 4 which is 3-methoxy-11β-methyl-17α-N,N-dimethylamino-propynylestra-2,5(10)-dien-17β-ol.

6. A quaternary ammonium salt of the formula

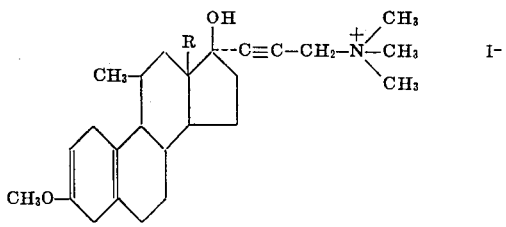

where

R is as defined in claim 1.

7. The compound of claim 6 which is 3-methoxy-11β-methyl-17α-N,N-dimethyl-aminopropynylestra-2,5(10)-dien-17β-ol -methiodide.

* * * * *